United States Patent
Ying et al.

(10) Patent No.: US 10,228,503 B2
(45) Date of Patent: Mar. 12, 2019

(54) LIGHT GUIDE PLATE AND FABRICATING METHOD THEREOF, BACKLIGHT SOURCE, DISPLAY DEVICE

(71) Applicants: Boe Technology Group Co., Ltd., Beijing (CN); Boe Optical Science and Technology Co., Ltd., Suzhou (CN)

(72) Inventors: Wentao Ying, Beijing (CN); Xiaoli Xie, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 5 days.

(21) Appl. No.: 15/082,231

(22) Filed: Mar. 28, 2016

(65) Prior Publication Data
US 2017/0075053 A1    Mar. 16, 2017

(30) Foreign Application Priority Data
Sep. 11, 2015 (CN) .......................... 2015 1 0577718

(51) Int. Cl.
*F21V 8/00* (2006.01)

(52) U.S. Cl.
CPC .......... *G02B 6/0035* (2013.01); *G02B 6/0043* (2013.01); *G02B 6/0061* (2013.01); *G02B 6/0065* (2013.01)

(58) Field of Classification Search
CPC .. G02B 6/0035; G02B 6/0011; G02B 6/0015; G02B 6/0043; G02B 6/0061; G02B 6/0065
(Continued)

(56) References Cited

U.S. PATENT DOCUMENTS

2007/0103931 A1*  5/2007  Lee ...................... G02B 6/0023
                                                        362/561
2008/0247191 A1* 10/2008  Hsu ...................... G02B 3/0043
                                                        362/612
(Continued)

FOREIGN PATENT DOCUMENTS

CN    102650706      8/2012
CN    102661544      9/2012
(Continued)

OTHER PUBLICATIONS

Office action from Chinese Application No. 201510577718.1 dated Oct. 23, 2017.
(Continued)

*Primary Examiner* — Paultep Savusdiphol
(74) *Attorney, Agent, or Firm* — Calfee, Halter & Griswold LLP

(57) ABSTRACT

A light guide plate, a fabricating method thereof, a backlight source, and a display device. The light guide plate comprises a light guide plate main body, with the surface of the light guide plate main body being provided with a blue coating. The blue coating mixes with yellow light strengthened gradually from a light entrance end to a light remote end of the light guide plate main body to form white light. The fabricating method of the light guide plate comprises: providing a light guide plate main body; forming a blue coating on a surface of the light guide plate main body; and curing the light guide plate main body provided with the blue coating. The present disclosure further provides a backlight source and a display device. The backlight source comprises the above light guide plate, and the display device comprises the above backlight source.

12 Claims, 3 Drawing Sheets

(58) Field of Classification Search
USPC .................................................. 362/606, 618
See application file for complete search history.

(56) References Cited

U.S. PATENT DOCUMENTS

| | | | | |
|---|---|---|---|---|
| 2010/0053939 A1* | 3/2010 | Fan | ...................... | G02B 6/0025 362/97.3 |
| 2012/0182762 A1* | 7/2012 | Hu | ...................... | G02B 6/0023 362/606 |
| 2014/0009961 A1* | 1/2014 | Sakaguchi | ........... | G02B 6/0055 362/609 |
| 2014/0146563 A1* | 5/2014 | Watanabe | ............. | G02B 6/0043 362/606 |
| 2015/0077990 A1* | 3/2015 | Park | ........................ | F21V 11/00 362/235 |
| 2017/0045674 A1* | 2/2017 | Fan | ...................... | G02B 6/0021 |

FOREIGN PATENT DOCUMENTS

| CN | 103277710 | 9/2013 |
|---|---|---|
| JP | 2012094283 | 5/2012 |

OTHER PUBLICATIONS

Second Office Action for Chinese Patent Application No. 201510577718.1 dated Jan. 11, 2018.
Third Office Action for Chinese Patent Application No. 201510577718.1 dated Mar. 6, 2018.

\* cited by examiner

LIGHT GUIDE PLATE AND FABRICATING METHOD THEREOF, BACKLIGHT SOURCE, DISPLAY DEVICE

RELATED APPLICATIONS

The present application claims the benefit of Chinese Patent Application No. 201510577718.1, filed on Sep. 11, 2015, the entire disclosure of which is incorporated herein by reference.

FIELD OF THE INVENTION

The present disclosure relates to the field of liquid crystal display technology, particularly to a light guide plate and a fabricating method thereof, a backlight source, and a display device.

BACKGROUND OF THE INVENTION

With the continuous developments in the field of display technology, the liquid crystal display device has been widely applied in electronic products, such as smart phone, panel computer, and laptops. However, since the liquid crystal panel itself does not have the function of emitting light, it is generally necessary to use a backlight source as the light source to implement the display function.

The light guide plate is one of the key components of the backlight source. In the injection and molding process of the light guide plate, after the plastic raw material is melted, it is injected into the mold cavity at a high speed in the high temperature state, hence, the plastic raw material will be carbonized in the strong shear thermal state, which may result in physical property changes. Thus the light emitted by the molded light guide plate will have non-uniform spectrum, such that the problem of color yellowing may occur to the backlight source. In addition, when spraying or printing mesh points on the light guide plate, and performing UV curing to the light guide plate sprayed or printed with mesh points, the UV glue may also produce yellowing effect via UV irradiation, and result in color yellowing of the backlight source.

In order to improve the above problem, the commonly used solutions in the prior art include: (1) using a light guide plate material with higher flowability so that the difference between the carbonization degrees of the material that flows previously and the material that flows subsequently after cooling will be reduced, thereby enabling the color temperature deviation of the light guide plate to be reduced, and mitigating the problem of color yellowing of the backlight source to a certain extent; (2) performing injection moulding after reducing the material temperature and increasing the mould temperature appropriately. When injection molding the light guide plate, the influence of the mould temperature to the light guide plate is smaller than the influence of the material temperature to the light guide plate. Hence, performing injection molding after reducing the material temperature and increasing the mould temperature appropriately will enable the color temperature deviation at different parts of the light guide plate to be reduced, and mitigate the problem of color yellowing of the backlight source to a certain extent; and (3) When performing injection molding, filling the interior of the injection molding machine with nitrogen to prevent the raw material from being oxidized due to contacting with the oxygen, which can also improve the color temperature deviation problem at different parts of the light guide plate, thereby mitigating the problem of color yellowing of the backlight source.

However, the above solutions can only mitigate the color yellowing problem of the backlight source in a very small degree, and cannot eliminate color yellowing of the backlight source effectively.

SUMMARY OF THE INVENTION

An object of the present disclosure lies in providing a light guide plate and a fabricating method thereof, a backlight source, and a display device, which can eliminate color yellowing of the backlight source effectively.

In order to achieve the above object, the present disclosure provides the following technical solutions:

In one aspect, the present disclosure provides a light guide plate, comprising a light guide plate main body, a surface of the light guide plate main body being provided with a blue coating, the blue coating mixing with yellow light strengthened gradually from a light entrance end to a light remote end of the light guide plate main body to form white light.

In a second aspect, the present disclosure further provides a fabricating method of a light guide plate, characterized by comprising:

providing a light guide plate main body; forming a blue coating on a surface of the light guide plate main body; and curing the light guide plate main body provided with the blue coating.

Moreover, the present disclosure further provides a backlight source, the backlight source comprising the above light guide plate.

Further, the present disclosure further provides a display device, the display device comprising the above backlight source.

The light guide plate provided by the present disclosure arranges a blue coating on a surface of the light guide plate main body thereof. When the light is propagated from the light entrance end to the light remote end, since the blue coating strengthens reflection of blue light, while light of other colors are all weakened by the blue coating, the blue light will be strengthened gradually after the light is reflected by the blue coating for multiple times, the strengthened blue light can mix with the yellow light strengthened gradually from the light entrance end to the light remote end of the light guide plate main body to form white light, therefore, it can eliminate color yellowing of the backlight source effectively, ensure chroma balance of the light displayed by the backlight source and the liquid crystal display device, and improve the display quality.

BRIEF DESCRIPTION OF THE DRAWINGS

The drawings explained here are used for providing further understanding to the present disclosure, which constitute a part of the present disclosure. The schematic embodiments and the explanations thereof are used for explaining the present disclosure, which do not constitute inappropriate limitations to the present disclosure. In the drawings.

DETAILED DESCRIPTION OF THE INVENTION

The following reference indications will be utilized throughout the specification and drawings: 1—light guide plate main body, 2—light guide plate mesh points; 3—blue coating, 4—light source. In order to explain the light guide plate and the fabricating method thereof, the backlight source, and the display device provided by the embodiments of the present disclosure further, next, they will be described in detail with reference to the drawings.

As shown in FIGS. 1 to 4, an embodiment of the present disclosure provides a light guide plate, comprising a light guide plate main body 1, a surface of the light guide plate main body 1 being provided with a blue coating 3, the blue coating 3 mixing with yellow light strengthened gradually from a light entrance end to a light remote end of the light guide plate main body 1 to form white light.

Figure 1:
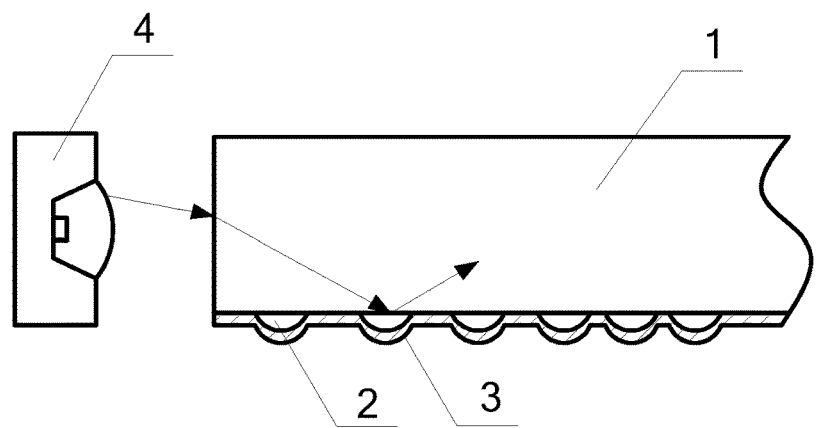
FIG. 1 is a structural schematic view of a light guide plate provided by an embodiment of the present disclosure.

As shown in FIG. 1, when the backlight source adopts the above light guide plate, a light source 4 is arranged at the left side of the light guide plate main body 1. The side of the light guide plate main body 1 close to the light source 4 is a light entrance end (left side of the light guide plate main body 1) and the side away from the light source 4 is a light remote end (right side of the light guide plate main body 1). A bottom surface of the light guide plate main body 1 is provided with a blue coating 3. When the light is propagated from the light entrance end to the light remote end of the light guide plate main body 1, since the blue coating 3 has a relatively high reflectivity to blue light, while a relatively low reflectivity to light of other colors, the blue light will be strengthened gradually after the light is reflected by the blue coating 3 for multiple times. The strengthened blue light can mix with the yellow light strengthened gradually from the light entrance end to the light remote end of the light guide plate main body 1 to form white light, thereby eliminating yellowing of the backlight source.

Figure 2:
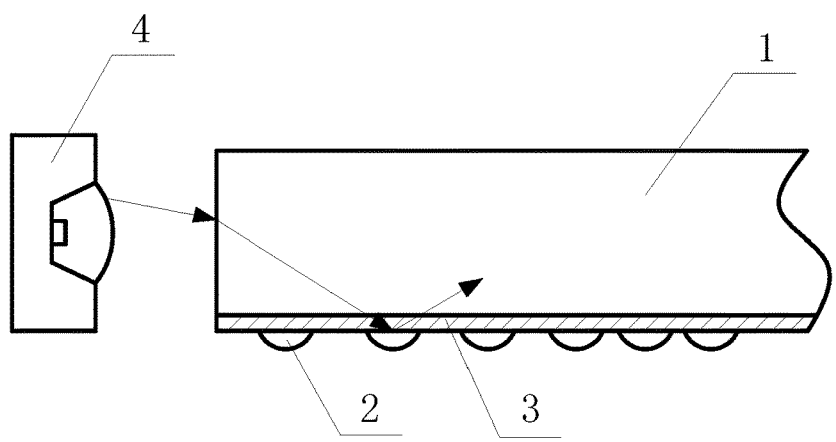
FIG. 2 is a structural schematic view of another light guide plate provided by an embodiment of the present disclosure.
Figure 3:
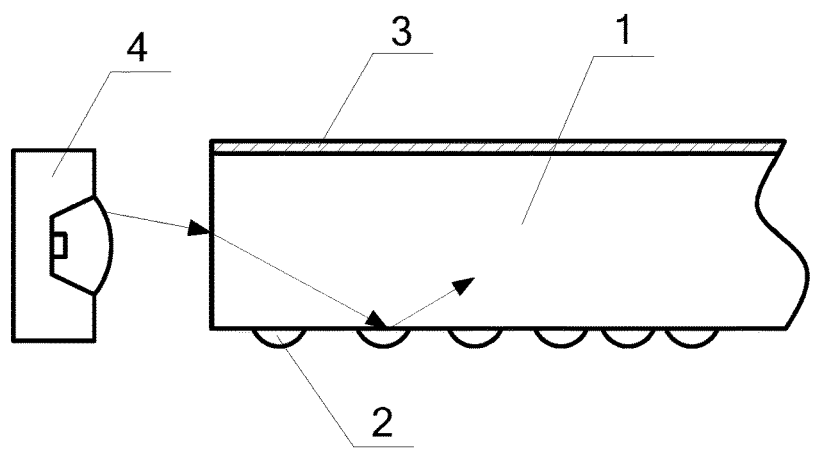
FIG. 3 is a structural schematic view of a further light guide plate provided by an embodiment of the present disclosure.
Figure 4:
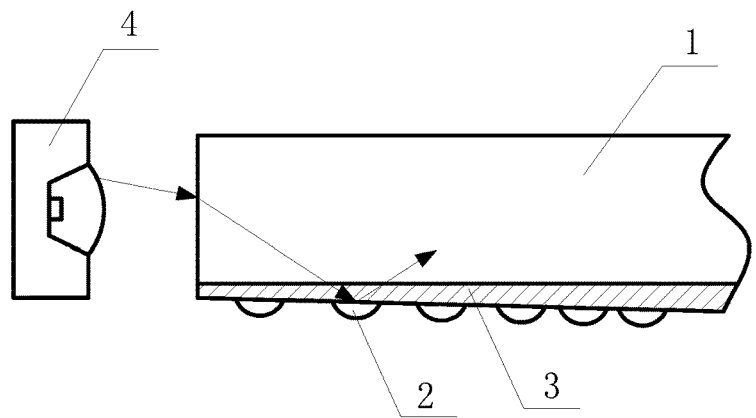
FIG. 4 is a structural schematic view of yet another light guide plate provided by an embodiment of the present disclosure.

The blue coating 3 can be arranged on the entire surface of the light guide plate main body 1. In order to save cost, the blue coating 3 can also be arranged on the bottom surface of the light guide plate main body 1 as shown in FIG. 1, FIG. 2, and FIG. 4. Alternatively, the blue coating 3 can also be arranged on the light exit surface of the light guide plate main body 1 as shown in FIG. 3. In some embodiments, the blue coating 3 is made from blue pigment, the blue pigment can be cobalt blue pigment, and/or the cobalt blue pigment has high reflectivity to blue light. Alternatively, the blue pigment can also be complex cobalt blue pigment, the complex cobalt blue pigment is improved in both coloring power and reflectivity to blue light relative to the cobalt blue pigment. The yellowing of the backlight source can be eliminated better by arranging the complex cobalt blue pigment on the surface of the light guide plate main body 1.

Specifically, when fabricating the light guide plate, in order to facilitate the operation and simplify the fabricating process of the light guide plate, as shown in FIG. 1, FIG. 2, and FIG. 3, the thickness of the blue coating arranged on the light guide plate main body 1 is uniform from the light entrance end to the light remote end of the light guide plate main body 1. The blue coating can be arranged using the manner of coating, i.e., coating the blue coating 3 on the surface of the light guide plate main body 1. Certainly, other manners can also be used, such as preparing the blue coating 3 in advance, then attaching the blue coating 3 onto the surface of the light guide plate main body 1. When the blue coating 3 is coated onto the surface of the light guide plate main body 1 using the coating manner, in order to ensure uniform thickness of the blue coating 3, the operator only needs to ensure consistent coating speed from the light entrance end to the light remote end of the light guide plate main body 1 in the process of coating the blue coating 3. For the convenience of operation, the speed of the coating machine can be set constant.

Alternatively, as shown in FIG. 4, the thickness of the blue coating 3 arranged on the light guide plate main body 1 increases gradually from the light entrance end to the light remote end of the light guide plate main body 1. Since non-uniform color temperature may occur after the light guide plate main body 1 is formed by injection molding, the color temperature at the light entrance end is higher, the color temperature at the light remote end is lower, when the light is emitted to the light guide plate main body 1. The yellow light from the light entrance end to the light remote end of the light guide plate main body 1 is strengthened gradually. By arranging the blue coating 3 with gradually increased thickness from the light entrance end to the light remote end of the light guide plate main body 1, the effect of eliminating color yellowing of the backlight source will be more obvious, the quality of light emitted by the light guide plate can be improved further.

Figure 5:
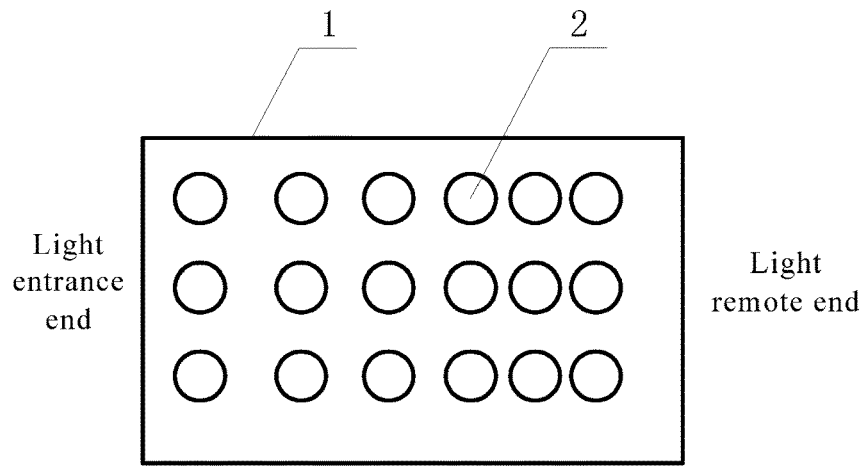
FIG. 5 is a distribution schematic view of light guide plate mesh points provided by an embodiment of the present disclosure.

In order to ensure brightness uniformity of the light emitted by the light guide plate, as shown in FIG. 5, the bottom surface of the light guide plate main body 1 is provided with light guide plate mesh points 2, and the density of the light guide plate mesh points 2 increases gradually from the light entrance end to the light remote end of the light guide plate main body 1. After the light enters the light guide plate main body 1, due to loss of light energy produced in the transmission process, the light energy at the light entrance is strongest, while the light energy at the light remote end is weakest, which results in non-uniform brightness of the light emitted by the light guide plate finally. By using the light guide plate mesh points 2 in the above arrangement manner, the diffusing effect of light can be enhanced gradually from the light entrance end to the light remote end, thereby ensuring brightness uniformity of the light emitted by the light guide plate.

It needs to be explained that when the blue coating 3 is arranged at the bottom surface of the light guide plate main body 1, the light guide plate mesh points 2 can be located between the bottom surface of the light guide plate main body 1 and the blue coating 3, as shown in FIG. 1. Alternatively, as shown in FIG. 2 and FIG. 4, the light guide plate mesh points 2 can also be located at the bottom of the light guide plate main body 1 and the blue coating 3, i.e., the blue coating 3 is arranged between the bottom surface of the light guide plate main body 1 and the light guide plate mesh points 2.

By arranging the blue coating 3 on the surface of the light guide plate main body 1 to neutralize with the yellow light strengthened gradually from the light entrance end to the light remote end of the light guide plate main body 1 so as to form white light, the yellowing of the backlight source can be eliminated effectively. The light guide plate mesh points 2 with gradually increased density from the light entrance end to the light remote end of the light guide plate main body 1 are sprayed or printed on the bottom surface of the light guide plate main body 1, which ensures brightness uniformity of the light emitted by the light guide plate and further improves the quality of the light emitted by the light guide plate.

Figure 6:
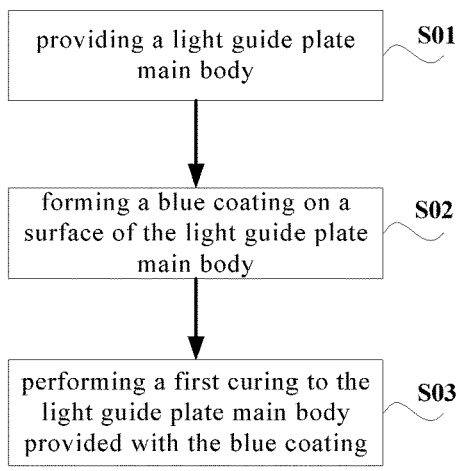
FIG. 6 is a flow chart of a fabricating method of a light guide plate provided by an embodiment of the present disclosure.

As shown in FIG. 6, an embodiment of the present disclosure further provides a fabricating method of a light guide plate, comprising:

Step S01: providing a light guide plate main body 1. The light guide plate main body 1 can be provided with light guide plate mesh points 2, and can also not be provided with the light guide plate mesh points 2. In the case of being provided with the light guide plate mesh points 2, the light guide plate mesh points 2 and the light guide plate main body 1 are formed through one-shot injection molding by an injection molding machine.

Step S02: forming a blue coating 3 on a surface of the light guide plate main body 1. The blue coating 3 can be formed through coating process. The blue coating 3 can also be prepared in advance, then the blue coating 3 is attached to the surface of the light guide plate main body 1. If it is formed through the coating process, the blue coating 3 can use blue pigment.

Step S03: performing a first curing to the light guide plate main body 1 provided with the blue coating 3. Performing a first curing to the light guide plate main body 1 provided with the blue coating 3 can increase adhesive force of the blue coating 3 to the light guide plate main body 1, and avoid the problem of bad effect of eliminating the color yellowing of the backlight source caused by break off of the blue coating 3. The manner of performing the first curing can be heating-up curing, room temperature curing, UV curing etc. Preferably, the embodiment of the present disclosure adopts UV curing. By using the UV curing, the environmental pollution is small, the curing speed is high, and the energy sources are saved, the performance of the cured light guide plate is good.

The fabricating method of the light guide plate provided by the embodiment of the present disclosure can fabricate the light guide plate as stated above and eliminate the yellowing of the backlight source effectively.

Figure 7:
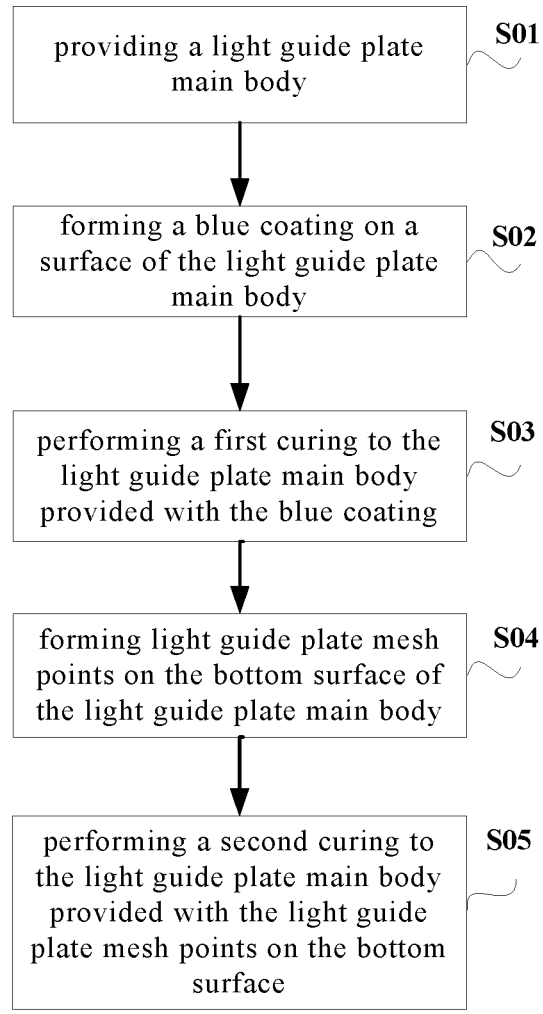
FIG. 7 is a flow chart of another fabricating method of a light guide plate provided by an embodiment of the present disclosure.

It needs to be supplemented that when the light guide plate main body 1 is not provided with the light guide plate mesh points 2, as shown in FIG. 7, the light guide plate main body 1 is generally formed through injection moulding or die cutting. When it is required to form the light guide plate mesh points 2 on the light guide plate main body 1, after step S03, it further comprises the following step.

Step S04: forming light guide plate mesh points 2 on a bottom surface of the light guide plate main body 1. The light guide plate mesh points 2 can be sprayed on the bottom surface of the light guide plate main body 1 by ink jetting. Alternatively, they can also be formed on the bottom surface of the light guide plate main body 1 by printing or hot-pressing. When fabricating the light guide plate mesh points 2, the light guide plate mesh points 2 with uniform density distribution can be formed from the light entrance end to the light remote end of the light guide plate main body 1. In order to ensure brightness uniformity of the light emitted by the light guide plate, preferably, light guide plate mesh points 2 with gradually increased density from the light entrance end to the light remote end of the light guide plate main body 1 can be formed on the bottom surface of the light guide plate main body 1. It is designed in such a way that the diffusing effect of the light can be enhanced gradually from the light entrance end to the light remote end, thereby ensuring brightness uniformity of the light emitted by the light guide plate.

After the light guide plate mesh points 2 are fabricated at step S04, the fabricating process of the light guide plate is completed. Alternatively, after step S04, step S05 is added: performing a second curing to the light guide plate main body 1 provided with light guide plate mesh points on the bottom surface. Performing the second curing can improve the adhesion effect between the light guide plate mesh points 2 and the light guide plate main body 1 or between the light guide plate mesh points 2 and the blue coating 3. The manner of performing the second curing can use the UV curing.

An embodiment of the present disclosure further provides a backlight source and a display device, wherein the backlight source comprises the light guide plate as stated above. The display device comprises a display panel and the above backlight source for providing backlight for the display panel. By using the backlight source of the above technical solution, the color yellowing of the backlight source can be eliminated effectively.

It needs to be explained that the above display device can be any product or component having the display function such as a liquid crystal display panel, a mobile phone, a panel computer, a television, a display, a laptop, a digital photo frame, a navigator, etc.

The preceding disclosure merely includes specific implementing modes of the present disclosure. The protection scope of the present disclosure is not limited to this. Any modifications or replacements that can be easily conceived by the skilled person familiar with the present technical field within the technical scope disclosed by the present disclosure should be covered within the protection scope of the present disclosure. Therefore, the protection scope of the present disclosure should be subject to the protection scopes of the claims attached.

The invention claimed is:

1. A light guide plate, comprising:
a light guide plate main body; and
a surface of the light guide plate main body being provided with a blue coating, wherein the blue coating is mixed with yellow light strengthened gradually from a light entrance end to a light remote end of the light guide plate main body to form white light, the thickness of the blue coating increases gradually from the light entrance end to the light remote end of the light guide plate main body, and the bottom surface of the light guide plate main body being provided with light guide plate mesh points, the density of the light guide plate mesh points increasing gradually from the light entrance end to the light remote end of the light guide plate main body.

2. The light guide plate according to claim 1, wherein the blue coating is arranged on a light exit surface or a bottom surface of the light guide plate main body.

3. A backlight source, comprising the light guide plate according to claim 1.

4. The backlight source according to claim 3, wherein the blue coating is arranged on a light exit surface or a bottom surface of the light guide plate main body.

5. A display device, comprising the backlight source according to claim 3.

6. The display device according to claim 5, wherein the blue coating is arranged on a light exit surface or a bottom surface of the light guide plate main body.

7. A fabricating method of a light guide plate, comprising:
providing a light guide plate main body;
forming a blue coating on a surface of the light guide plate main body, the thickness of the blue coating increasing gradually from the light entrance end to the light remote end of the light guide plate main body;
forming light guide plate mesh points on a bottom surface of the light guide plate main body, and the density of the light guide plate mesh points increasing gradually from the light entrance end to the light remote end of the light guide plate main body; and
curing the light guide plate main body provided with the blue coating.

8. The fabricating method of a light guide plate according to claim 7, wherein the curing is UV curing.

9. The fabricating method of a light guide plate of claim 7, wherein the light guide plate mesh points and the light guide plate main body are formed through one-shot injection molding by an injection molding machine.

10. The fabricating method of a light guide plate according to claim 9, characterized in that the curing is UV curing.

11. The fabricating method of a light guide plate of claim 7, wherein the light guide plate main body is formed through die cutting or injection molding; and wherein, after curing the light guide plate main body provided with the blue coating, the method further comprises the step of:
forming light guide plate mesh points on a bottom surface of the light guide plate main body.

12. The fabricating method of a light guide of claim 11, wherein the curing is UV curing.

\* \* \* \* \*